US 10,138,906 B2

(12) United States Patent
Hayashi et al.

(10) Patent No.: US 10,138,906 B2
(45) Date of Patent: Nov. 27, 2018

(54) JET PUMP, MANUFACTURING METHOD OF JET PUMP, AND FUEL SUPPLY DEVICE HAVING JET PUMP

(71) Applicant: DENSO CORPORATION, Kariya, Aichi-pref. (JP)

(72) Inventors: Norihiro Hayashi, Kariya (JP); Kiyomori Kobayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 517 days.

(21) Appl. No.: 14/876,164

(22) Filed: Oct. 6, 2015

(65) Prior Publication Data
US 2016/0102683 A1 Apr. 14, 2016

(30) Foreign Application Priority Data

Oct. 13, 2014 (JP) .................................. 2014-209563

(51) Int. Cl.
*F02M 37/02* (2006.01)
*F02M 37/10* (2006.01)
*F04F 5/10* (2006.01)
*F04F 5/46* (2006.01)
*F04F 5/24* (2006.01)
(Continued)

(52) U.S. Cl.
CPC ............ *F04F 5/46* (2013.01); *F02M 37/025* (2013.01); *F02M 37/106* (2013.01); *F04F 5/10* (2013.01); *B29L 2031/7496* (2013.01); *F04F 5/18* (2013.01); *F04F 5/24* (2013.01)

(58) Field of Classification Search
CPC ...... F02M 37/04; F02M 37/12; F02M 37/025; F02M 37/106; F04F 5/10; F04F 5/42; F04F 5/46

USPC ........ 123/509, 510, 514; 417/151, 158, 194, 417/195, 198
See application file for complete search history.

(56) References Cited

U.S. PATENT DOCUMENTS 4,911,134 A * 3/1990 Olsson ................ B60K 15/077
123/509
5,070,849 A * 12/1991 Rich .................... F02M 37/106
123/509
(Continued)

FOREIGN PATENT DOCUMENTS

WO 2016/059769 4/2016

OTHER PUBLICATIONS

Norihiro, et al., U.S. Appl. No. 15/305,171, filed Oct. 19, 2016 and corresponds to WO 2016/059769 (49 pages).

*Primary Examiner* — Alexander B Comley
(74) *Attorney, Agent, or Firm* — Nixon & Vanderhye PC

(57) ABSTRACT

A common width direction, along which a passage width of a communication passage section and a passage width of a pressurizing passage are defined, is perpendicular to an extending direction of a flow restricting passage section. A first passage wall surface and a second passage wall surface, which define the communication passage section therebetween, are opposed to each other in the common width direction. The flow restricting passage section opens in the first passage wall surface. The second passage wall surface is concavely curved relative to the first passage wall surface toward the flow restricting passage section, so that the passage width of the communication passage section is progressively reduced toward the flow restricting passage section within a predetermined range that is equal to or smaller than the passage width of the pressurizing passage.

6 Claims, 17 Drawing Sheets

(51) Int. Cl.
  *B29L 31/00* (2006.01)
  *F04F 5/18* (2006.01)

(56) References Cited

U.S. PATENT DOCUMENTS

| | | | | |
|---|---|---|---|---|
| 5,289,810 A * | 3/1994 | Bauer | ............... | F02M 37/025 123/510 |
| 5,715,798 A * | 2/1998 | Bacon | ............... | F02M 37/025 123/509 |
| 5,769,061 A * | 6/1998 | Nagata | ............... | B01D 35/26 123/509 |
| 5,992,394 A * | 11/1999 | Mukaidani | ............... | B01D 35/027 123/509 |
| 6,098,600 A * | 8/2000 | Umetsu | ............... | F02M 37/106 123/514 |
| 6,155,793 A * | 12/2000 | Tuckey | ............... | F02M 37/025 123/509 |
| 6,880,569 B2 * | 4/2005 | Kato | ............... | F02M 37/025 123/514 |
| 6,981,490 B2 * | 1/2006 | Nagata | ............... | F02M 37/025 123/509 |
| 7,007,679 B2 * | 3/2006 | Okabe | ............... | F02M 37/025 123/509 |
| 7,077,109 B2 * | 7/2006 | Lee | ............... | F02M 37/0029 123/509 |
| 7,117,856 B2 * | 10/2006 | Honda | ............... | B60K 15/077 123/514 |
| 7,588,017 B2 * | 9/2009 | Briggs | ............... | F02M 37/025 123/509 |
| 8,726,886 B2 * | 5/2014 | Mason | ............... | F02M 37/0088 123/509 |
| 2002/0172601 A1 * | 11/2002 | Lienig | ............... | F02M 37/025 417/198 |
| 2003/0188786 A1 * | 10/2003 | Toki | ............... | B01D 35/0273 137/565.34 |
| 2004/0123843 A1 * | 7/2004 | Kumagai | ............... | F02M 37/025 123/509 |
| 2006/0231079 A1 * | 10/2006 | Paluszewski | ............... | F02M 37/025 123/514 |
| 2007/0217921 A1 * | 9/2007 | Oohashi | ............... | F02M 37/025 417/87 |
| 2009/0013970 A1 * | 1/2009 | Danjo | ............... | F02M 37/106 123/509 |
| 2009/0290994 A1 * | 11/2009 | Kieninger | ............... | F04F 5/463 417/198 |
| 2010/0202898 A1 * | 8/2010 | Mason | ............... | F04F 5/10 417/151 |
| 2010/0319793 A1 * | 12/2010 | Smid | ............... | F02M 37/025 137/565.22 |

\* cited by examiner

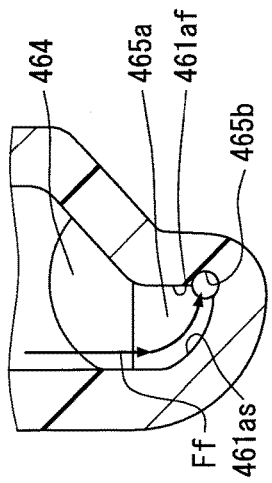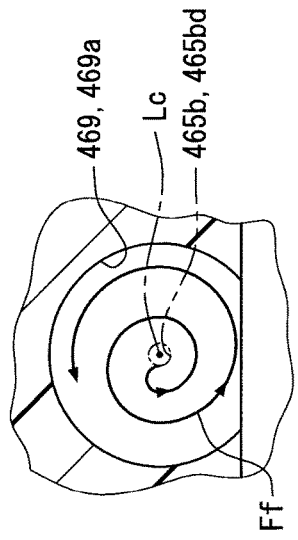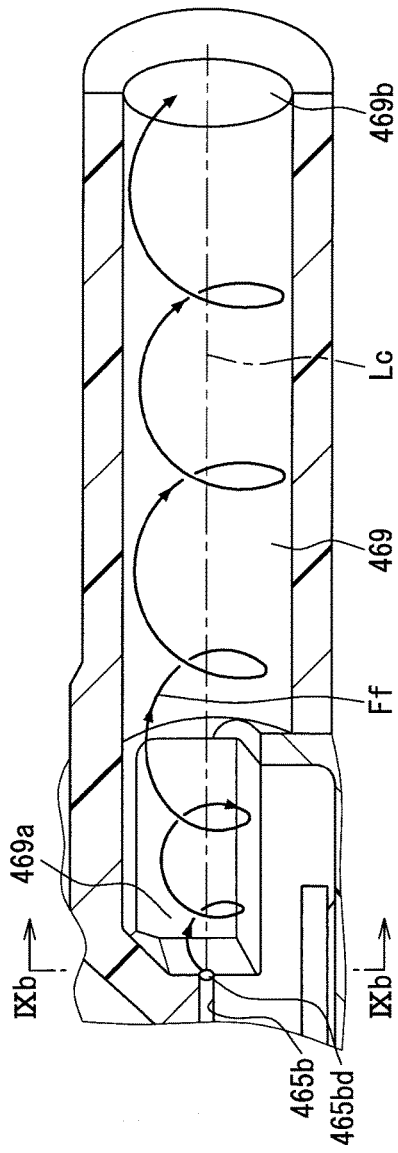
FIG. 9A
FIG. 9B
FIG. 9C

JET PUMP, MANUFACTURING METHOD OF JET PUMP, AND FUEL SUPPLY DEVICE HAVING JET PUMP

CROSS REFERENCE TO RELATED APPLICATION

This application is based on and incorporates herein by reference Japanese Patent Application No. 2014-209563 filed on Oct. 13, 2014.

TECHNICAL FIELD

The present disclosure relates to a jet pump, a manufacturing method of the jet pump, and a fuel supply device having the jet pump.

BACKGROUND

In a fuel supply device that supplies fuel, which is stored in a fuel tank that receives a sub-tank, to an internal combustion engine located at an outside of the fuel tank, a jet pump has been widely used to pump the fuel from the fuel tank into an inside of the sub-tank. According to the disclosure of JPH11-166460A (corresponding to U.S. Pat. No. 6,098,600A), which discloses one such jet pump, pressurized fuel, which is supplied to a pressurizing passage, is discharged into a diffuser passage through a nozzle passage, so that the fuel, which is stored in the fuel tank, is pumped into the inside of the sub-tank through the diffuser passage.

In the jet pump of JPH11-166460A (corresponding to U.S. Pat. No. 6,098,600A), the nozzle passage includes a communication passage section, is communicated with a downstream end of the pressurizing passage, and a flow restricting passage section, which is communicated with a downstream end of the communication passage section and reduces a flow rate of the fuel in comparison to a flow rate of the fuel at the communication passage section. Here, two passage wall surfaces are opposed to each other while the communication passage section is interposed between the two passage wall surfaces in a width direction that is perpendicular to the flow restricting passage section. Both of these two passage wall surfaces are curved in a form of a concave surface, so that these passage wall surfaces cooperate together to form an arcuate surface, which extends less than 360 degrees in a circumferential direction. With the above-described configuration, the fuel flow, which flows from the pressurizing passage to the communication passage section, is conducted toward the flow restricting passage section located on the downstream side while being swirled along the arcuate surface of the communication passage section. Thereby, the fuel flow is discharged from the flow restricting passage section into the diffuser passage in a state where the fuel flow is swirled. As a result, in the diffuser passage, the fuel flow, which is swirled, forms a liquid fuel film along an entire passage cross-surface area of the diffuser passage. Thus, it is possible to limit a backflow of pumped fuel into the diffuser passage, and thereby the pumping reliability can be improved.

However, in the jet pump of JPH11-166460A (corresponding to U.S. Pat. No. 6,098,600A), the passage width of the pressurizing passage, which is measured in a width direction perpendicular to the extending direction of the flow restricting passage section, is larger than a passage width of the communication passage section, which is measured in the width direction. Thus, a resin portion, which is configured to form the communication passage section of the nozzle passage, needs to be molded by a slide core that is different from a slide core used for molding of a resin portion, which is configured to form the pressurizing passage. In such a case, in order to release the slide core from the resin portion, which forms the communication passage section, after the molding, a portion of the resin portion, which forms the communication passage section, cannot be molded integrally with the resin portion, which forms the pressurizing passage. Thus, an additional manufacturing process of separately molding these resin portions and fixing these resin portions together is required.

SUMMARY

The present disclosure is made in view of the above disadvantages.

According to the present disclosure, there is provided a jet pump that includes a resin body that is made of resin and forms a pressurizing passage, a nozzle passage and a diffuser passage. Stored fuel, which is stored in a fuel tank, is pumped by the jet pump through the diffuser passage by discharging pressurized fuel, which is supplied to the pressurizing passage, into the diffuser passage through the nozzle passage. At least a part of the resin body is integrally molded to form the pressurizing passage and the nozzle passage in the part of the resin body. The nozzle passage includes a communication passage section and a flow restricting passage section. The communication passage section is communicated with a downstream end of the pressurizing passage. The flow restricting passage section is communicated with a downstream end of the communication passage section and reduces a flow rate of the pressurized fuel in comparison to a flow rate of the pressurized fuel, which flows through the communication passage section. A common width direction, along which a passage width of the communication passage section and a passage width of the pressurizing passage are defined, is perpendicular to an extending direction of the flow restricting passage section. A first passage wall surface and a second passage wall surface, which define the communication passage section between the first passage wall surface and the second passage wall surface, are opposed to each other in the common width direction. The flow restricting passage section opens in the first passage wall surface. The second passage wall surface is concavely curved relative to the first passage wall surface toward the flow restricting passage section, so that the passage width of the communication passage section is progressively reduced toward the flow restricting passage section within a predetermined range that is equal to or smaller than the passage width of the pressurizing passage.

In the above jet pump, the resin body may include one resin portion, in which the diffuser passage and the flow restricting passage section are coaxially formed, and another resin portion, in which the pressurizing passage and the communication passage section are formed. The one resin portion and the another resin portion may be integrally molded.

According to the present disclosure, there is provided a manufacturing method of the jet pump. According to the manufacturing method, the another resin portion, in which the pressurizing passage and the communication passage section are formed, is molded with a first slide core, and the one resin portion, in which the diffuser passage and the flow restricting passage section are coaxially formed, is molded with a second slide core simultaneously with the molding of the another resin portion.

According to the present disclosure, there is provided a fuel supply device that supplies stored fuel, which is stored in a fuel tank, to an internal combustion engine located at an outside of the fuel tank. The fuel supply device includes a sub-tank that is placed in an inside of the fuel tank, and the above-described jet pump that is received in the sub-tank and pumps the stored fuel, which is stored in the fuel tank, into the sub-tank.

BRIEF DESCRIPTION OF THE DRAWINGS

The drawings described herein are for illustration purposes only and are not intended to limit the scope of the present disclosure in any way.

FIG. 9A is a schematic descriptive diagram for describing a fuel flow generated in the fuel supply device of FIG. 1, indicating a cross section taken along line IV-IV in FIG. 2;

FIG. 9B is a schematic descriptive diagram for describing the fuel flow generated in the fuel supply device of FIG. 1, indicating a cross section taken along IXb-IXb in 9C;

FIG. 9C is a schematic diagram for describing the fuel flow generated in the fuel supply device of FIG. 1, indicating a cross section taken along line III-III in FIG. 2;

DETAILED DESCRIPTION

Figure 1:
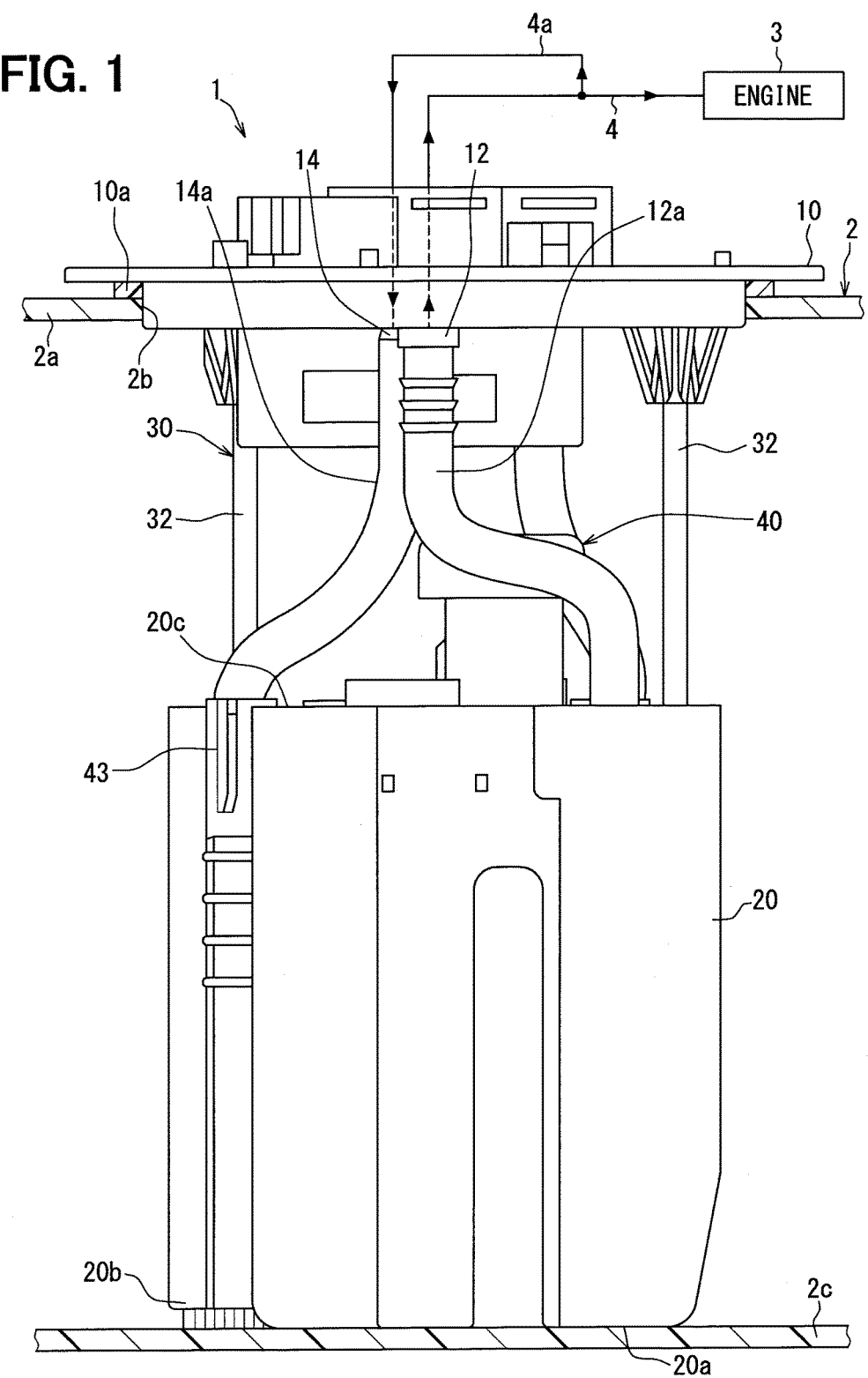
FIG. 1 is a front view showing a fuel supply device according to a first embodiment of the present disclosure.

Various embodiments of the present disclosure will be described with reference to the accompanying drawings. In the following respective embodiments, similar components will be indicated by the same reference numerals and may not be redundantly described for the sake of simplicity. In each of the following embodiments, if only a part of a structure is described, the remaining part of the structure is the same as that of the previously described embodiment(s). Furthermore, besides combinations of components explicitly described in the respective embodiments, the components of one or more of the following embodiments may be partially combined with components of another one or more of the following embodiments even if such a combination(s) is not explicitly described in the following description as long as such a combination does not pose a disadvantage.

First Embodiment

As shown in FIG. 1, a fuel supply device 1 according to a first embodiment of the present disclosure is installed to a fuel tank 2 of a vehicle. The device 1 supplies fuel, which is stored in the fuel tank 2, to fuel injection valves of an internal combustion engine 3 indirectly through a high pressure pump or the like or directly without passing through the high pressure pump or the like. The fuel tank 2, to which the device 1 is installed, is made of resin or metal and is configured into a hollow form to store the fuel to be supplied to the internal combustion engine 3. The internal combustion engine 3, which receives the fuel from the device 1, may be a diesel engine or a gasoline engine. A top-to-bottom direction and lateral directions in FIGS. 1 and 3 to 6 substantially coincide with a vertical direction and horizontal directions, respectively, of the vehicle placed on a horizontal surface (and hereinafter simply referred to as the vertical direction and the horizontal directions).

Now, a structure and an operation of the device 1 will be described.

As shown in FIGS. 1 to 4, the device 1 includes a flange 10, a sub-tank 20, an adjust mechanism 30, and a pump unit 40.

Figure 2:
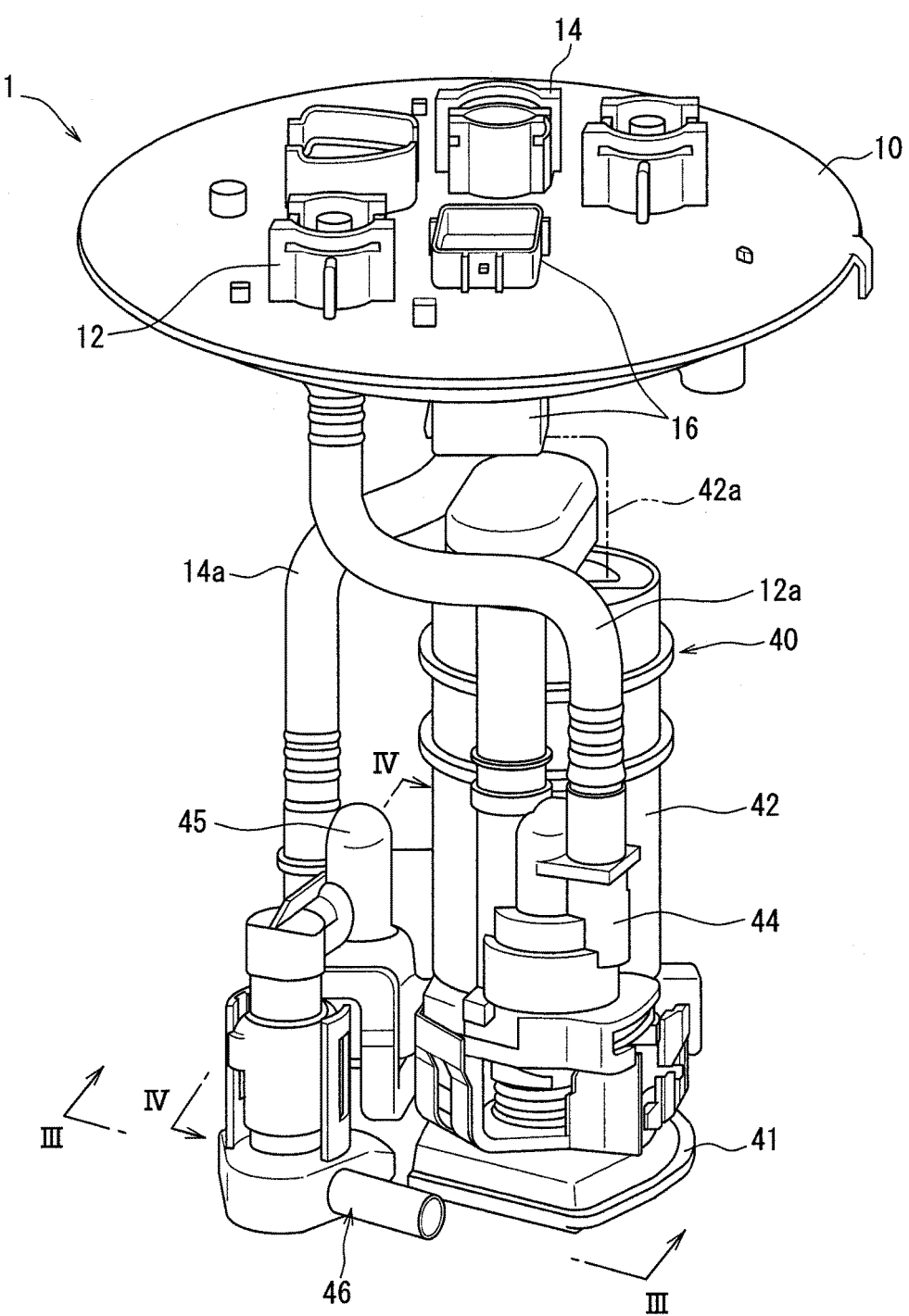
FIG. 2 is a perspective view showing the fuel supply device of FIG. 1.

With reference to FIG. 1, the flange 10 is made of resin and is configured into a circular plate form, and the flange 10 is installed to a top plate portion 2a of the fuel tank 2. A packing 10a is clamped between the flange 10 and the top plate portion 2a, so that a through-hole 2b, which is formed in the top plate portion 2a, is closed. As shown in FIGS. 1 and 2, the flange 10 integrally includes a fuel supply conduit 12, a return conduit 14 and an electrical connector 16.

The fuel supply conduit 12 is communicated with the pump unit 40, which is placed in the fuel tank 2, through a flexible tube 12a, which is flexible. The fuel supply conduit 12 is communicated with a fuel path 4, which is located at an outside of the fuel tank 2 and is placed between the fuel tank 2 and the internal combustion engine 3. The fuel supply conduit 12, which has the above-described communicating configuration, supplies the fuel, which is pumped out of the fuel tank 2 by a fuel pump 42 of the pump unit 40, to the internal combustion engine 3 located at the outside of the fuel tank 2. The return conduit 14 is communicated with a branch passage 4a, which extends from the fuel path 4 at the outside of the fuel tank 2. The return conduit 14 is communicated with the pump unit 40, which is installed in the fuel tank 2, through a flexible tube 14a, which is flexible. The return conduit 14, which has the above-described communicating configuration, returns the return fuel, which is branched from the supply fuel to be supplied to the internal combustion engine 3, from the outside of the fuel tank 2 to a residual pressure holding valve 45 of the pump unit 40 installed in the fuel tank 2. The electrical connector 16 shown in FIG. 2 electrically connects the fuel pump 42 to a control circuit (not shown) located at the outside of the fuel tank 2.

Figure 3:
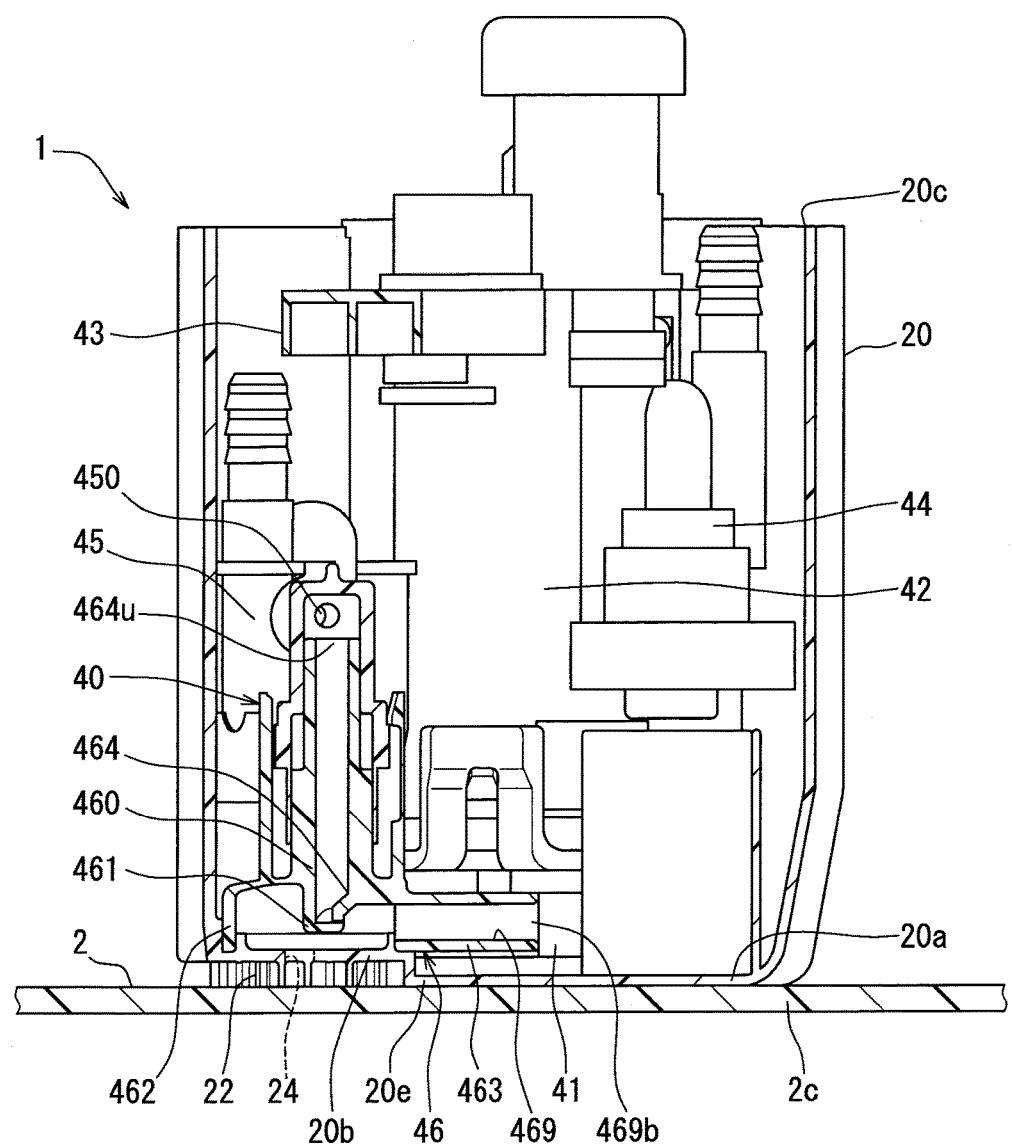
FIG. 3 is a cross-sectional view taken along line III-III in FIG. 2.
Figure 4:
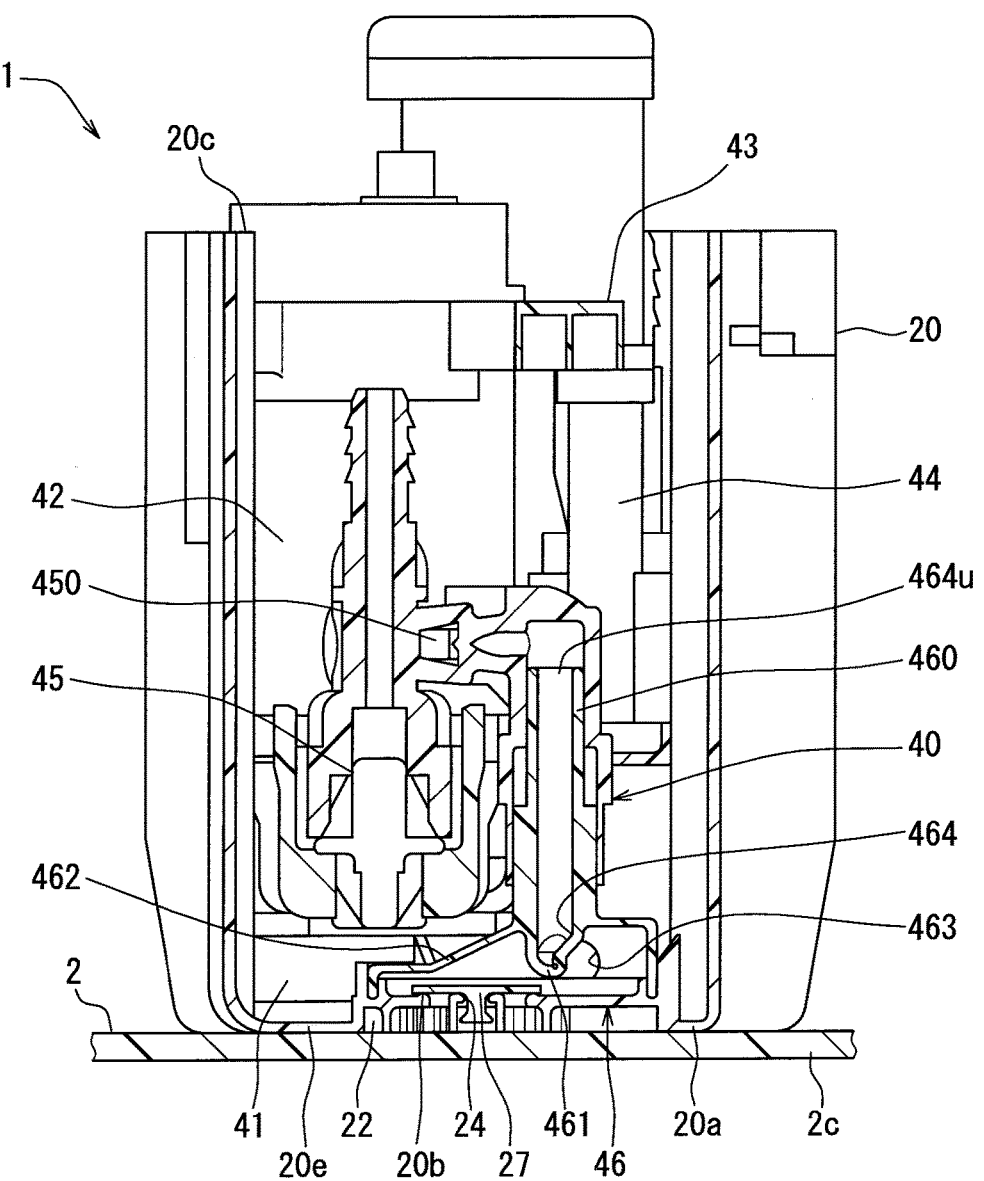
FIG. 4 is a cross-sectional view taken along line IV-IV in FIG. 2.

As shown in FIGS. 1, 3 and 4, the sub-tank 20 is made of resin and is configured into a cylindrical tubular form having a bottom, and the sub-tank 20 is placed in the inside of the fuel tank 2. An opening 20c of the sub-tank 20 opens toward the upper side. A bottom portion 20a of the sub-tank 20 is placed on a bottom portion 2c of the fuel tank 2. As shown in FIGS. 3 and 4, a flow inlet 24 is formed in a recessed bottom part 20b of the bottom portion 20a, which is recessed toward the upper side from a deepest bottom part 20e of the bottom portion 20a The flow inlet 24 is communicated with an inflow space 22, which is formed between the recessed bottom part 20b and the bottom portion 2c. The flow inlet 24 is communicated with a jet pump 46 of the pump unit 40. With the above-described communicating configuration, the stored fuel, which is stored in the fuel tank 2, flows from the inflow space 22 located on the lower side of the sub-tank 20 into the flow inlet 24 and is thereafter pumped by the jet pump 46 into the sub-tank 20. An umbrella valve 27 shown in FIG. 4 is installed to the recessed bottom part 20b of the present disclosure, so that the umbrella valve 27 opens the flow inlet 24 at the time of exerting a negative pressure of the jet pump 46, which will be described later in detail, to the umbrella valve 27.

As shown in FIG. 1, the adjust mechanism 30 includes a pair of support shafts 32, and an adjust spring (not shown). Each support shaft 32 is made of metal and is configured into a cylindrical form, and each support shaft 32 extends in the top-to-bottom direction in the inside of the fuel tank 2. An upper end of each support shaft 32 is fixed to the flange 10. At a lower side of each support shaft 32, which is lower than the upper end of the support shaft 32, the support shaft 32 is slidably guided by the sub-tank 20 in the top-to-bottom direction. The adjust spring is coaxially placed around a corresponding one of the support shafts 32 in the sub-tank 20 and is interposed between the sub-tank 20 and the corresponding support shaft 32. The adjust spring, which is held in the above-described interposing configuration, urges the bottom portion 20a of the sub-tank 20 against the bottom portion 2c of the fuel tank 2, as shown in FIGS. 1, 3 and 4.

The pump unit 40 is received in the sub-tank 20. As shown in FIGS. 2 to 4, the pump unit 40 includes a suction filter 41, the fuel pump 42, a pump holder 43, a relief valve 44, the residual pressure holding valve 45, and the jet pump 46.

The suction filter 41 is, for example, a non-woven filter and is placed in the inside of the sub-tank 20 on the upper side of the deepest bottom part 20e of the bottom portion 20a. The suction filter 41 filters the fuel to be drawn from the inside of the sub-tank 20 into the fuel pump 42 to remove foreign objects contained in the drawn fuel.

The fuel pump 42 is connected to an upper side of the suction filter 41 in the sub-tank 20. The fuel pump 42 is an electric pump in the present embodiment and is electrically connected to the electrical connector 16 through a flexible wiring 42a, which is flexible. The control circuit controls a drive operation of the fuel pump 42 through the electrical connector 16 to drive the fuel pump 42. The fuel pump 42, which is operated in the above-described manner, pressurizes the fuel drawn through the suction filter 41 in the sub-tank 20.

As shown in FIGS. 1, 3, and 4, the pump holder 43 is made of resin and is configured into an arm form, and the pump holder 43 is installed to the opening 20c of the sub-tank 20. The pump holder 43 holds the fuel pump 42 from radially outer side of the fuel pump 42.

As shown in FIGS. 2 to 4, the relief valve 44 is connected to a side of the fuel pump 42 in the inside of the sub-tank 20. The relief valve 44 is communicated with a discharge outlet (not shown) of the fuel pump 42. The relief valve 44 is communicated with the fuel supply conduit 12 through the flexible tube 12a. Furthermore, the relief valve 44 is also communicated to the inside of the sub-tank 20. In the above-described communicating configuration, when the pressure of the fuel, which is discharged from the fuel pump 42 and is supplied to the internal combustion engine 3, is below a relief pressure, the relief valve 44 is closed to maintain the pressure of the supplied fuel. In contrast, when the pressure of the fuel, which is supplied to the internal combustion engine 3, becomes equal to or higher than the relief pressure, the relief valve 44 is opened to release the pressure of the supplied fuel into the inside of the sub-tank 20.

The residual pressure holding valve 45 is connected to the side of the fuel pump 42 in the inside of the sub-tank 20. The residual pressure holding valve 45 is communicated to the return conduit 14 through the flexible tube 14a. Also, the residual pressure holding valve 45 is communicated to the jet pump 46. Under the above-described communicating configuration, as long as the pressure of the fuel, which is supplied to the internal combustion engine 3, is held equal to or higher than a valve opening pressure of the residual pressure holding valve 45, the residual pressure holding valve 45 is kept opened to discharge a portion of the supplied fuel from an outlet 450 to the jet pump 46 side. In contrast, when the pressure of the fuel, which is supplied to the internal combustion engine 3, becomes less than a valve closing pressure of the residual pressure holding valve 45, the residual pressure holding valve 45 is closed to hold the pressure of the supplied fuel.

The jet pump 46 is made of resin and is configured into a hollow form, and the jet pump 46 is connected to a side of the residual pressure holding valve 45 in the inside of the sub-tank 20. As shown in FIGS. 3 and 4, the jet pump 46 is placed on the recessed bottom part 20b of the bottom portion 20a of the sub-tank 20. The jet pump 46 is formed by integrally resin molding a pressurizing portion 460, a nozzle portion 461, an intake portion 462, and a diffuser portion 463 to form a one-piece resin body 46a of the jet pump 46.

The pressurizing portion 460 forms a pressurizing passage 464 in a form of a cylindrical hole that extends linearly in the top-to-bottom direction. That is, the pressurizing portion 460 is a resin portion, which forms the pressurizing passage 464. An upstream end 464u of the pressurizing passage 464 is communicated to the outlet 450 of the residual pressure holding valve 45. The pressurizing passage 464, which has the above-described communicating configuration, guides the pressurized fuel, which is outputted from the outlet 450 and is supplied to the upstream end 464u of the pressurizing passage 464, toward a downstream end 464d of the pressurizing passage 464 located at the lower side of the pressurizing passage 464 in FIGS. 5 and 6.

The nozzle portion 461 includes a communication forming portion 461a and a flow restriction forming portion 461b, which are placed on the lower side of the pressurizing portion 460. The communication forming portion 461a forms a communication passage section 465a as an upstream section of the nozzle passage 465. The flow restriction forming portion 461b forms a flow restricting passage section 465b as a downstream section of the nozzle passage 465. Specifically, the nozzle portion 461, which serves as the resin portion configured to form the nozzle passage 465, is constructed by combining the communication forming portion 461a, which serves as the resin portion configured to form the communication passage section 465a, and the flow restriction forming portion 461b, which serves as the resin portion configured to form the flow restricting passage section 465b.

Figure 5:
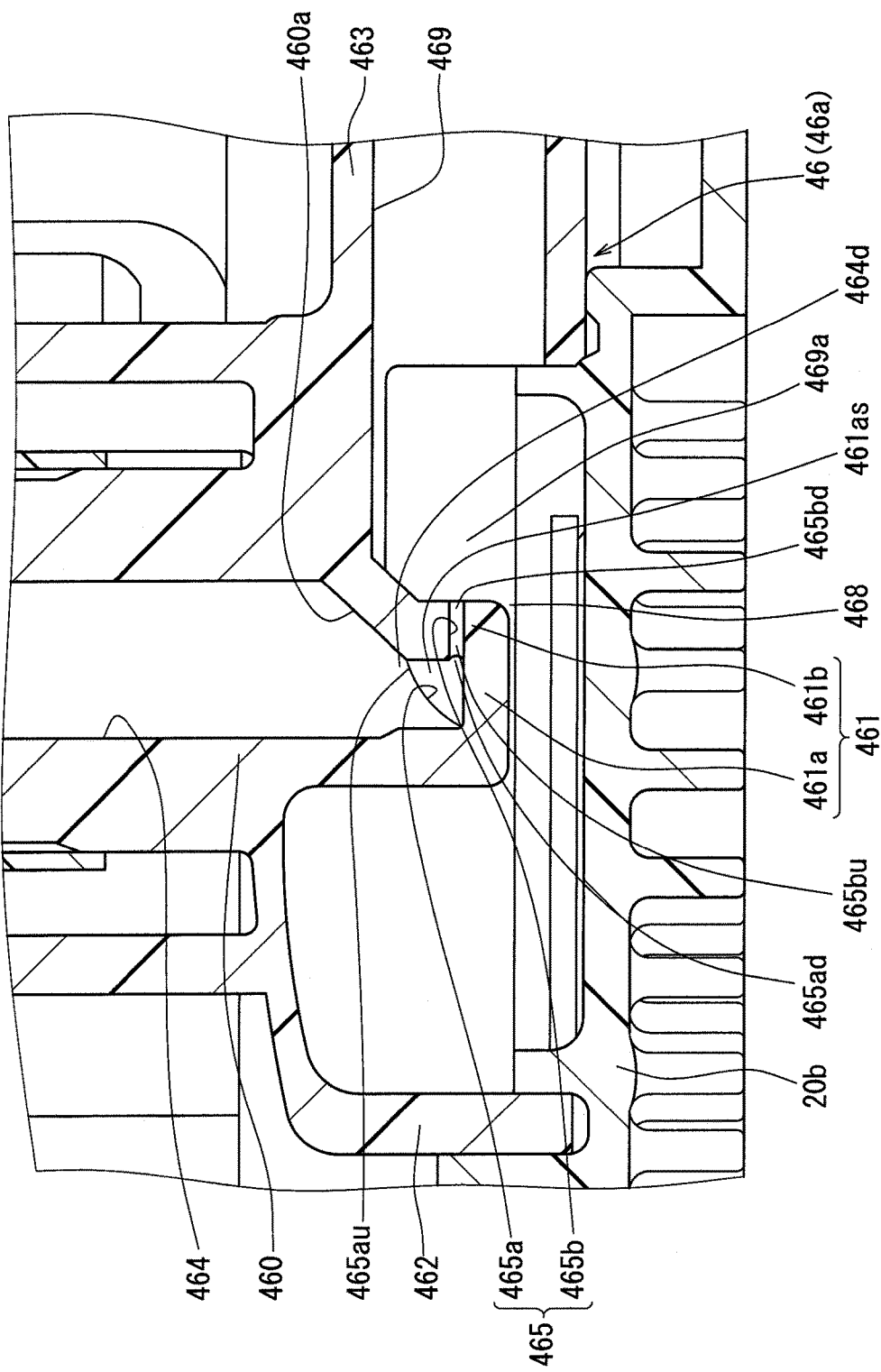
FIG. 5 is an enlarged partial cross-sectional view of a section of FIG. 3.
Figure 6:
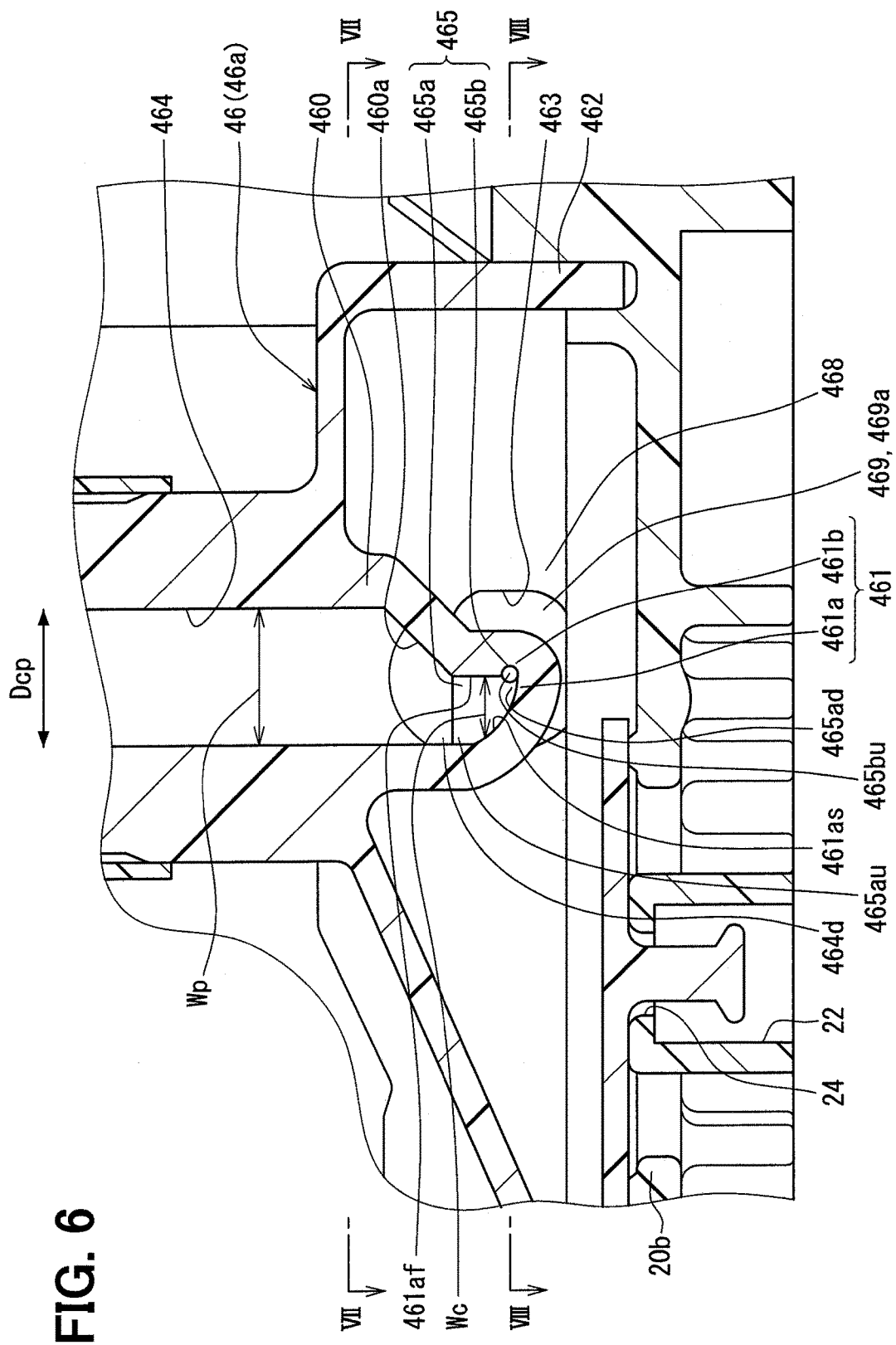
FIG. 6 is an enlarged partial cross-sectional view of a section of FIG. 4.
Figure 7:
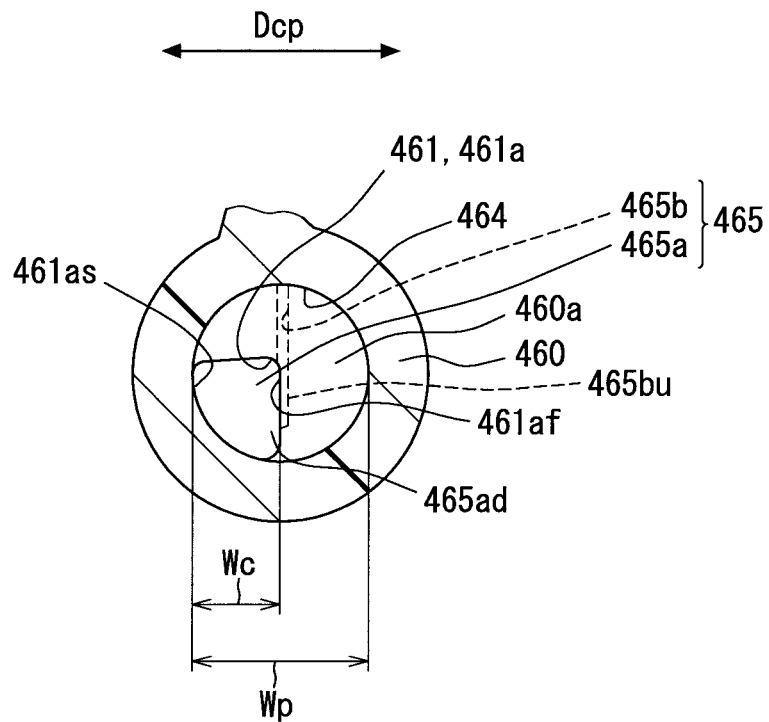
FIG. 7 is a cross-sectional view taken along line VII-VII in FIG. 6.
Figure 8:
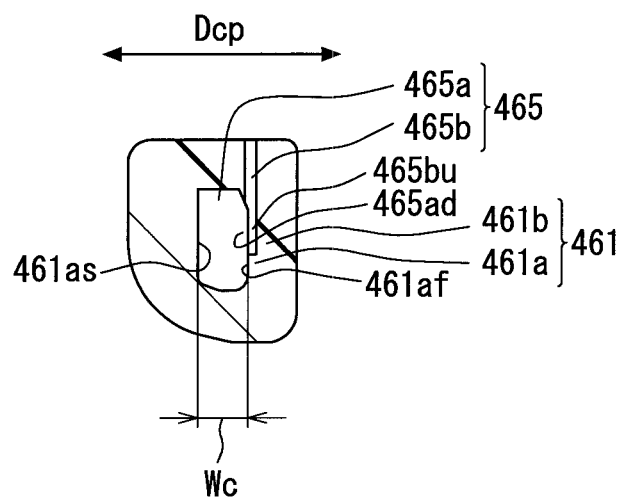
FIG. 8 is a cross-sectional view taken along line VIII-VIII in FIG. 6.

The communication forming portion 461a forms the communication passage section 465a as a space that is in a form of a partially spherical space, which corresponds to substantially one-eighth of a sphere space. An upstream end 465au of the communication passage section 465a is communicated to the downstream end 464d of the pressurizing passage 464. Here, a lateral direction, which is shown in FIGS. 6 to 8 and corresponds to a left-to-right direction in FIGS. 6 to 8, is defines as a common width direction Dcp, along which a passage width Wc of the communication passage section 465a and a passage width Wp of the pressurizing passage 464 are defined. Under the above definition, the passage width Wc of the communication passage section 465a is set to be within a range that is smaller than a passage width Wp of the pressurizing passage 464. Furthermore, in order to implement the above setting, as shown in FIGS. 5 to 7, a tapered passage wall surface 460a is formed in a portion of the pressurizing portion 460, which forms the downstream end 464d of the pressurizing passage 464 except a communicating part that is communicated to the communication passage section 465a. The tapered passage wall surface 460a is configured in a form of a circular conical surface that has a progressively reducing diameter that is progressively reduced toward the communication passage section 465a.

As shown in FIGS. 5 to 8, in the communication forming portion 461a, a first passage wall surface 461af and a second passage wall surface 461as, which define the communication passage section 465a therebetween, are opposed to each other in the common width direction Dcp. The first passage wall surface 461af is formed into a form of a planar surface that extends in both of a lateral direction, which is substantially perpendicular to the common width direction Dcp, and the vertical direction. An upstream end 465bu of the flow restricting passage section 465b opens in a portion of the first passage wall surface 461af, which forms a downstream end 465ad of the communication passage section 465a. In the present embodiment, the upstream end 465bu of the flow restricting passage section 465b, is formed at a location, which is further spaced from the second passage wall surface 461as in comparison to the first passage wall surface 461af except a portion of the upstream end 465bu, which projects from the first passage wall surface 461af toward the second passage wall surface 461as.

The second passage wall surface 461as is concavely curved in a form of a concave surface that corresponds to substantially one-eighth of a sphere surface relative to the first passage wall surface 461af toward the flow restricting passage section 465b. Here, particularly, the second passage wall surface 461as of the present embodiment is continuously curved from a corresponding location, which is spaced from the downstream end 464d of the pressurizing passage 464 toward the downstream side, all the way down to the flow restricting passage section 465b. In a cross-sectional view of FIG. 6, in which the upstream end 465bu of the flow restricting passage section 465b is viewed from the communication passage section 465a side, the second passage wall surface 461as of the present embodiment is curved from the pressurizing passage 464 side in a counterclockwise direction. With the above-described curved configuration, the passage width Wc of the communication passage section 465a, which is located between the first passage wall surface 461af and the second passage wall surface 461as, is progressively reduced toward the flow restricting passage section 465b within a predetermined range that is smaller than the passage width Wp of the pressurizing passage 464. Furthermore, in the communication passage section 465a, as indicated by an arrow in FIG. 9A, a fuel flow Ff, which is generated by flowing the pressurized fuel from the pressurizing passage 464 into the communication passage section 465a, enters the flow restricting passage section 465b, which is located on the downstream side of the communication passage section 465a, while the fuel flow Ff is swirled upon guiding of the fuel flow Ff along the second passage wall surface 461as, which has the curved configuration.

As indicated in FIGS. 5 to 8, the flow restriction forming portion 461b, which is formed integrally at the side of the communication forming portion 461a, forms the flow restricting passage section 465b, which is configured into a cylindrical hole that linearly extends in the lateral direction that is substantially perpendicular to the common width direction Dcp. As discussed above, the upstream end 465bu of the flow restricting passage section 465b opens in the first passage wall surface 461af, so that the upstream end 465bu of the flow restricting passage section 465b is communicated with the downstream end 465ad of the communication passage section 465a. At the flow restricting passage section 465b, a flow rate of the fuel is reduced in comparison to a flow rate of the fuel at the communication passage section 465a. As indicated by the arrow in FIG. 9A, the fuel flow Ff is swirled along the second passage wall surface 461as and is supplied from the communication passage section 465a into the flow restricting passage section 465b. Therefore, the fuel flow Ff of the reduced flow rate is outputted from a downstream end 465bd of the flow restricting passage section 465b in a state where the fuel flow Ff is swirled, as indicated in FIG. 9B.

As shown in FIGS. 5 and 6, the intake portion 462 forms an intake passage 468 configured into a form of a flat space that covers the flow inlet 24, which penetrates through the recessed bottom part 20b, from the upper side of the flow inlet 24. That is, the intake portion 462 is a resin portion, which forms the intake passage 468. The intake passage 468 is communicated with the flow inlet 24 on the lower side of the pressurizing portion 460 and the nozzle portion 461. The stored fuel of the fuel tank 2 can flow into the intake passage 468 of the above-described communicating configuration through the inflow space 22 and the flow inlet 24 held in the open state.

The diffuser portion 463 forms a diffuser passage 469 that is configured into a cylindrical hole that extends in the lateral direction from the flow restricting passage section 465b such that the diffuser passage 469 is coaxial with the flow restricting passage section 465b. That is, the diffuser portion 463 is a resin portion, which forms the diffuser passage 469. The upstream end of the diffuser passage 469 cooperates with the intake passage 468 to form a confluence passage section 469a, which is communicated with the downstream end 465bd of the flow restricting passage section 465b on the lower side of the pressurizing portion 460. As shown in FIG. 3, a downstream end of the diffuser passage 469 forms a flow outlet 469b, which opens straight forward in the lateral direction and is communicated with the inside of the sub-tank 20. With the above-described structure, the pressurized fuel of the reduced flow rate is discharged from the downstream end 465bd of the flow restricting passage section 465b into the confluence passage section 469a, and thereby a negative pressure is generated around the discharged flow of the fuel, which is discharged into the confluence passage section 469a. Thereby, the fuel, which flows from the flow inlet 24 held in the open valve state into the intake passage 468, is drawn into the diffuser passage 469 by the negative pressure. As a result, the drawn fuel receives the diffuser effect in the diffuser passage 469 and is thereby pumped into the sub-tank 20 through the flow outlet 469b of the diffuser passage 469.

At this time, as shown in FIGS. 9B and 9C, the fuel is discharged from the downstream end 465bd into the confluence passage section 469a in the state where the fuel is swirled. Thereby, the fuel flow Ff, which is generated in the diffuser passage 469, is discharged from the flow outlet 469b into the sub-tank 20 while forming a liquid fuel film along the entire passage cross section of the diffuser passage 469. Here, in the present embodiment, it is assumed that a lateral axis Lc extends from the flow restricting passage section 465b in the lateral direction. Under this assumption, since the second passage wall surface 461as is curved from the pressurizing passage 464 in the counterclockwise direction, the fuel flow Ff is generated in the diffuser passage 469 in such a manner that the fuel flow Ff is swirled about the lateral axis Lc in the counterclockwise direction in a view taken from the flow restricting passage section 465b.

Figure 10:
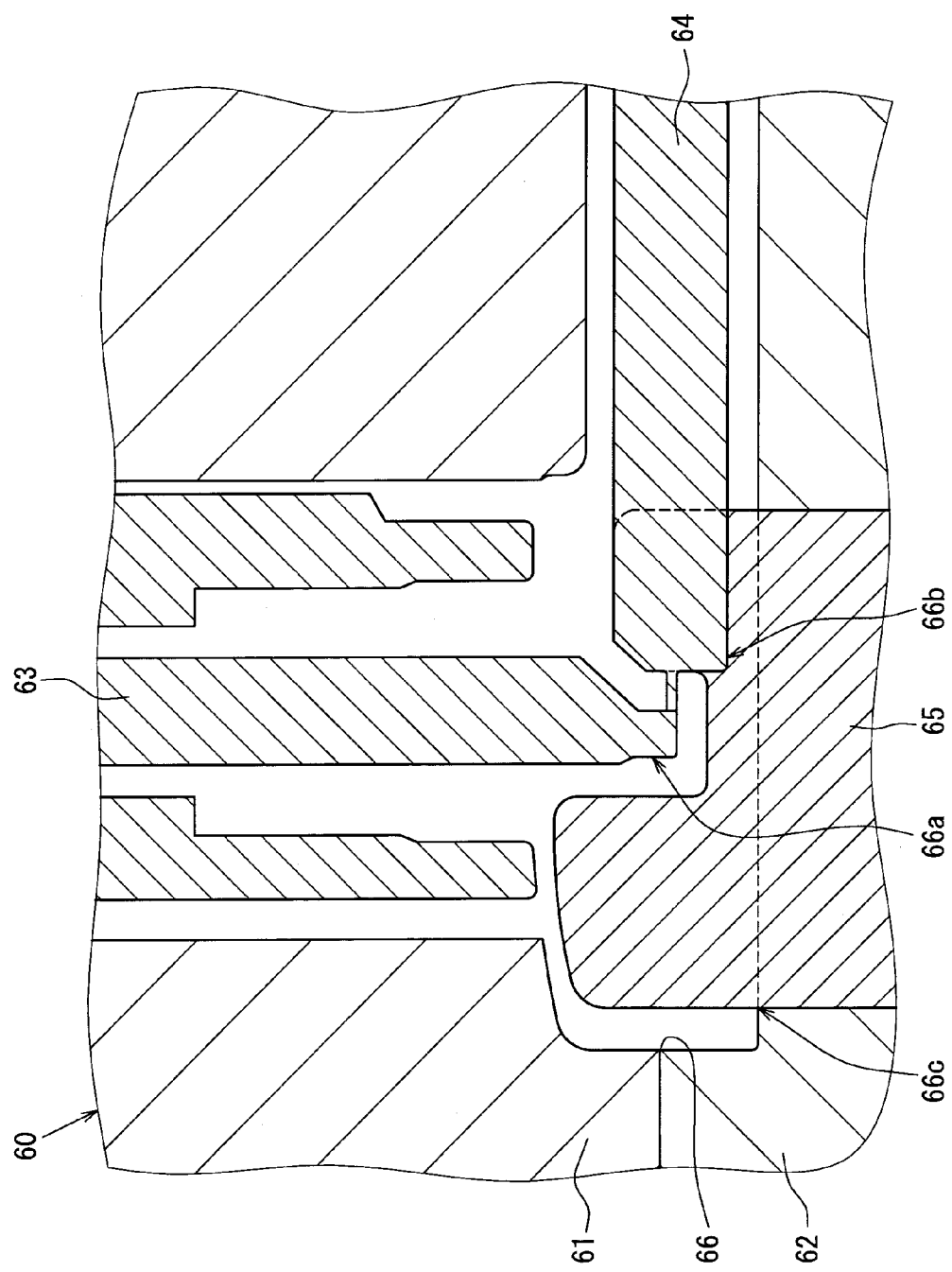
FIG. 10 is a cross-sectional view for describing a manufacturing method of a jet pump of the fuel supply device of FIG. 1.

Now, a manufacturing method of the jet pump 46 will be described. A mold 60 shown in FIG. 10 is used in the manufacturing of the jet pump 46. Specifically, the mold 60 made of metal includes cavity plates 61, 62 and slide cores 63, 64, 65.

The first cavity plate 61 and the second cavity plate 62 cooperate with each other to form a cavity 66, which has a shape that complements an outer shape of the jet pump 46. The first slide core 63 is positioned at a portion 66a of the cavity 66, which forms the pressurizing portion 460 and the communication forming portion 461a. The second slide core 64 is positioned at a portion 66b of the cavity 66, which forms the diffuser portion 463 and the flow restriction forming portion 461b. The third slide core 65 is positioned at a portion 66c of the cavity 66, which forms the intake portion 462.

At the time of manufacturing the jet pump 46 with the mold 60 having the above-described structure, the cavity 66 is formed through a mold closing operation of the first cavity plate 61 and the second cavity plate 62, as shown in FIG. 10. Furthermore, the slide cores 63, 64, 65, which respectively correspond to the portions 66a, 66b, 66c of the cavity 66, are respectively inserted into the portions 66a, 66b, 66c of the cavity 66.

Figure 11:
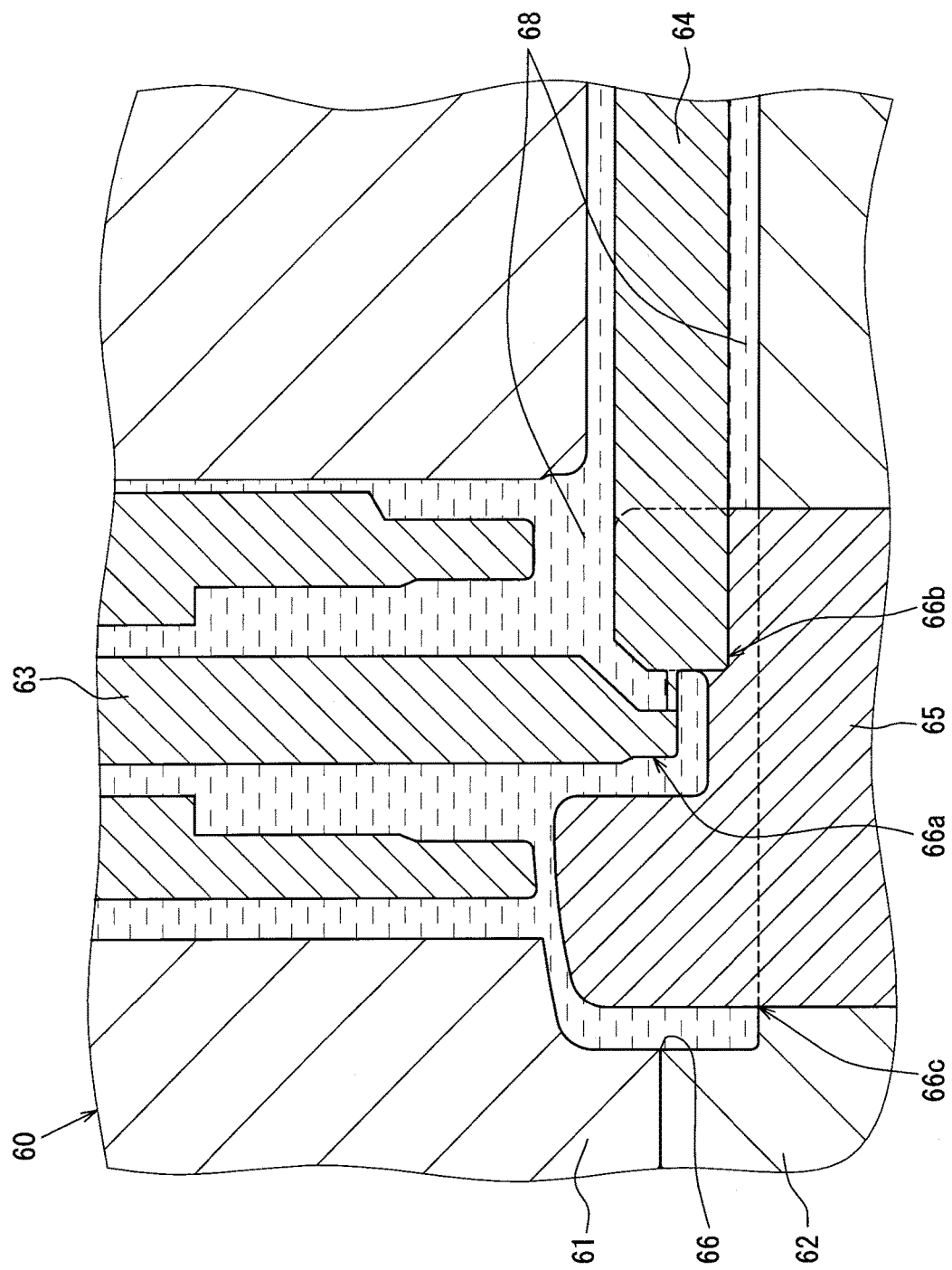
FIG. 11 is a cross-sectional view for describing the manufacturing method of the jet pump of the fuel supply device of FIG. 1.
Figure 12:
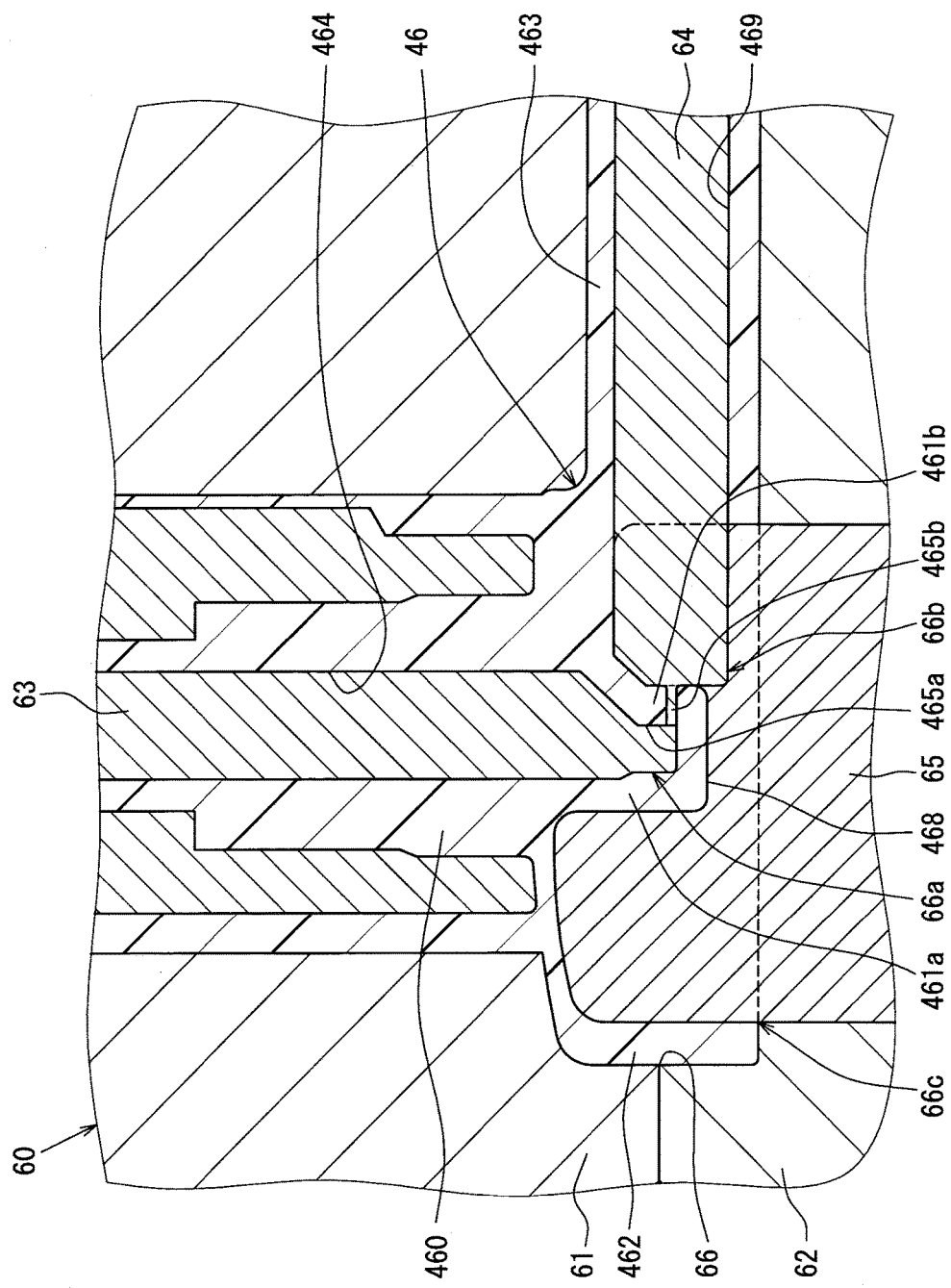
FIG. 12 is a cross-sectional view for describing the manufacturing method of the jet pump of the fuel supply device of FIG. 1.

Next, as shown in FIG. 11, the mold 60 is clamped in a mold clamping process, and molten resin 68 is injected into the cavity 66. In this way, the molten resin 68 is filled into the portions 66a, 66b, 66c of the cavity 66 and is thereafter cooled and solidified. Thus, as shown in FIG. 12, the jet pump 46 is resin molded in conformity with the shape of the cavity 66. In the present embodiment, the pressurizing portion 460 and the communication forming portion 461a, which respectively form the pressurizing passage 464 and the communication passage section 465a; the diffuser portion 463 and the flow restriction forming portion 461b, which respectively form the diffuser passage 469 and the flow restricting passage section 465b; and the intake portion 462, which forms the intake passage 468, are simultaneously and integrally molded.

Figure 13:
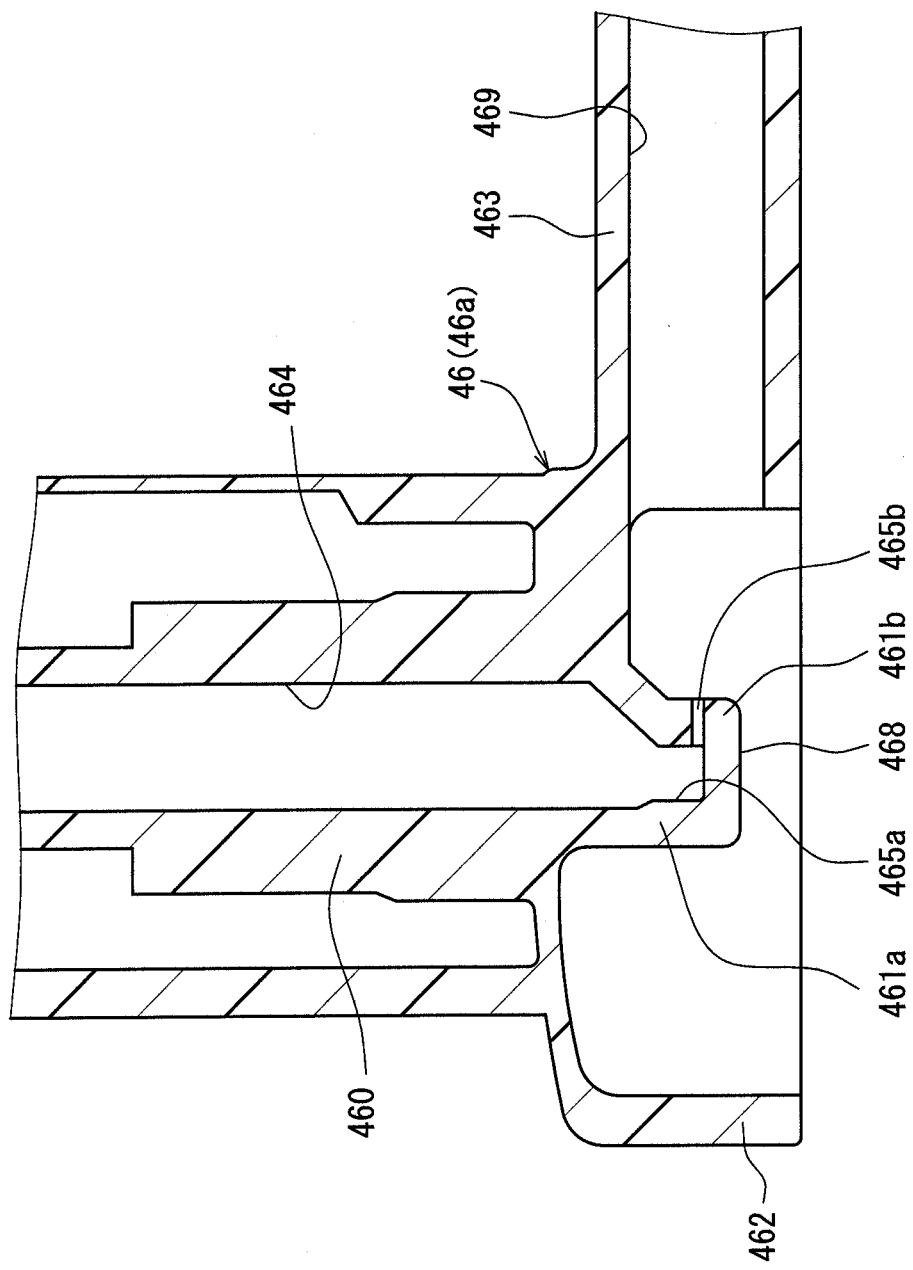
FIG. 13 is a cross-sectional view for describing the manufacturing method of the jet pump of the fuel supply device of FIG. 1.

When the molding is completed in the above manner, the first cavity plate 61 and the second cavity plate 62 are spaced away from each other in a mold opening process, and the jet pump 46 shown in FIG. 13 is removed from the mold 60 in a mold releasing process.

Now, advantages of the present embodiment will be described.

According to the first embodiment, the first passage wall surface 461af and the second passage wall surface 461as, which define the communication passage section 465a therebetween, are opposed to each other in the common width direction Dcp, which is perpendicular to the extending direction of the flow restricting passage section 465b. The second passage wall surface 461as is concavely curved relative to the first passage wall surface 461af, in which the flow restricting passage section 465b opens, toward the flow restricting passage section 465b. In this way, the fuel, which flows from the pressurizing passage 464 into the communication passage section 465a, is swirled along the second passage wall surface 461as and enters the flow restricting passage section 465b located on the downstream side of the communication passage section 465a. Therefore, the fuel is discharged from the flow restricting passage section 465b into the diffuser passage 469 in the state where the fuel is swirled. As a result, in the diffuser passage 469, since the fuel flow Ff, which is swirled, forms the liquid fuel film along the entire passage cross-sectional area of the diffuser passage 469, it is possible to limit a backflow of the pumped fuel into the diffuser passage 469. Therefore, the pumping reliability can be improved.

Furthermore, since the second passage wall surface 461as is curved toward the flow restricting passage section 465b, which opens in the first passage wall surface 461af, the passage width Wc of the communication passage section 465a, which is measured in the common width direction Dcp between the first passage wall surface 461af and the second passage wall surface 461as, is progressively reduced toward the flow restricting passage section 465b. Here, the above-described reducing configuration of the communication passage section 465a is implemented within the predetermined range, which is smaller than the passage width Wp of the pressurizing passage 464 in the common width direction Dcp. Accordingly, the communication forming portion 461a, which is the resin portion configured to form the communication passage section 465a of the nozzle passage 465, can be integrally molded by the first slide core 63, which is commonly used for the molding of the pressurizing portion 460, which is the resin portion configured to mold the pressurizing passage 464. Thereby, the productivity can be improved.

Accordingly, the pumping reliability and the productivity can be both improved for the fuel supply device 1, which has the jet pump 46 received in the sub-tank 20 that is placed in the fuel tank 2.

Furthermore, since the above-described reducing configuration of the communication passage section 465a is implemented within the predetermined range, which is smaller than the passage width Wp of the pressurizing passage 464, a pressure loss of the pressurized fuel can be reduced in the pressurizing passage 464, which has the larger passage width Wp, until the pressurized fuel flows into the communication passage section 465a, which has the smaller passage width Wc. In this way, in the communication passage section 465a, it is possible to ensure a required fluid force, which is required to generate the fuel flow Ff along the second passage wall surface 461as while swirling the fuel flow Ff. Thus, in the diffuser passage 469, it is possible to form the liquid fuel film, which is required to limit the backflow of the pumped fuel into the diffuser passage 469, by ensuring the swirling of the fuel discharged from the flow restricting passage section 465b, and thereby it is possible to improve the pumping reliability.

Furthermore, the second passage wall surface 461as is continuously curved all the way down to the flow restricting passage section 465b, so that it is possible to maximize the length of the curve of the second passage wall surface 461as, which is required to swirl the fuel flow Ff that flows from the pressurizing passage 464 toward the flow restricting passage section 465b. With the above-described configuration, the fuel flow Ff, which is discharged from the flow restricting passage section 465b into the diffuser passage 469, is reliably swirled to form the liquid fuel film that is required to limit the backflow of the pumped fuel. Thereby, the pumping reliability can be improved.

Furthermore, the communication forming portion 461a and the pressurizing portion 460, which cooperate together to serve as the resin portion configured to form the communication passage section 465a of the nozzle passage 465 and the pressurizing passage 464, are molded by the common first slide core 63. Also, at the same time, the flow restriction forming portion 461b and the diffuser portion 463, which cooperate together to serve as the resin portion configured to coaxially form the flow restricting passage section 465b of the nozzle passage 465 and the diffuser passage 469, are molded by the second slide core 64, which is provided separately from the first slide core 63. Accordingly, the resin portion, which forms the pressurizing passage 464 and the communication passage section 465a, and the resin portion, which forms the diffuser passage 469 and the flow restricting passage section 465b, can be integrally simultaneously molded as the one-piece resin body 46a of the present disclosure. Thereby, the productivity can be substantially improved.

Second Embodiment

Figure 14:
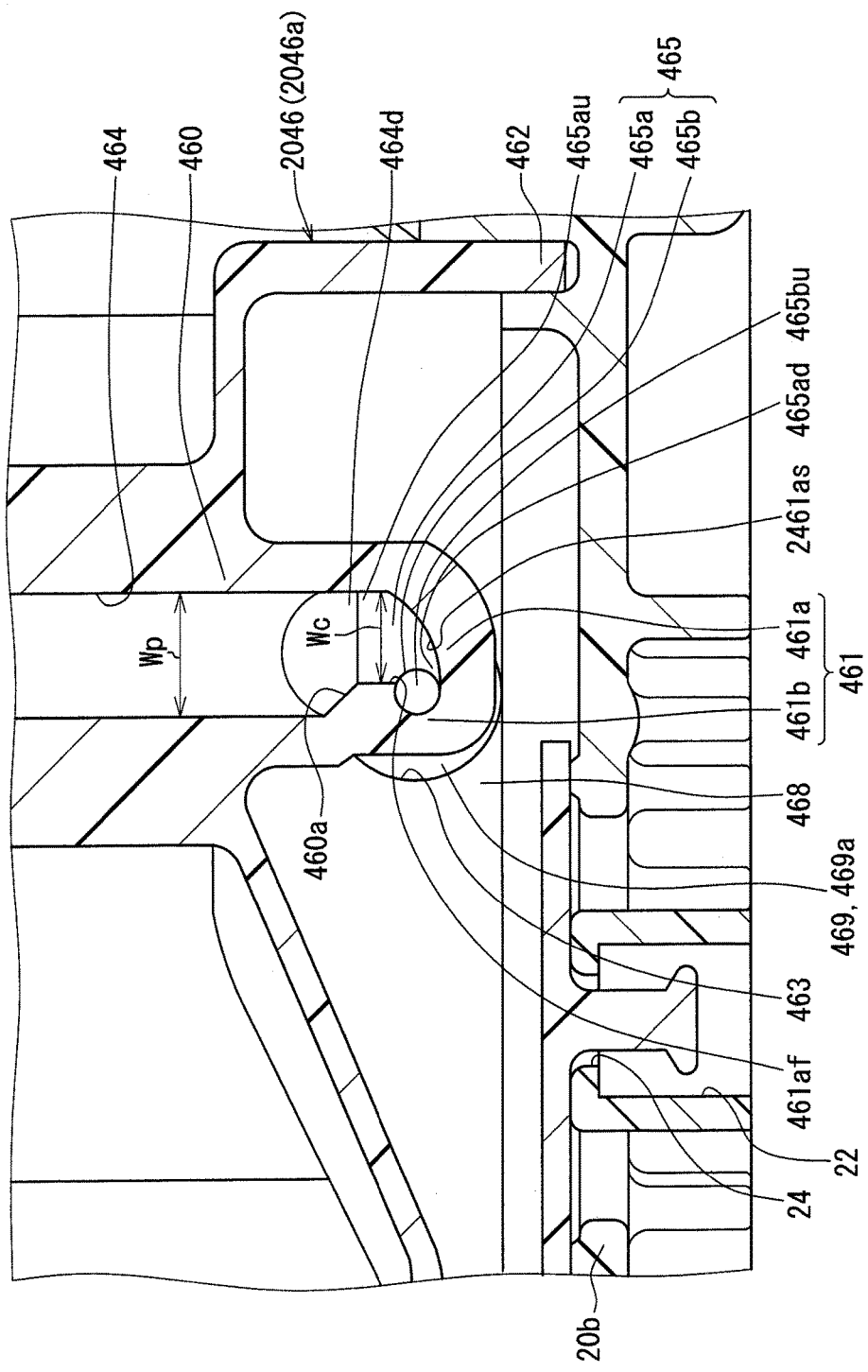
FIG. 14 is a cross-sectional view corresponding to FIG. 6, indicating a fuel supply device according to a second embodiment of the present disclosure.
Figure 15:
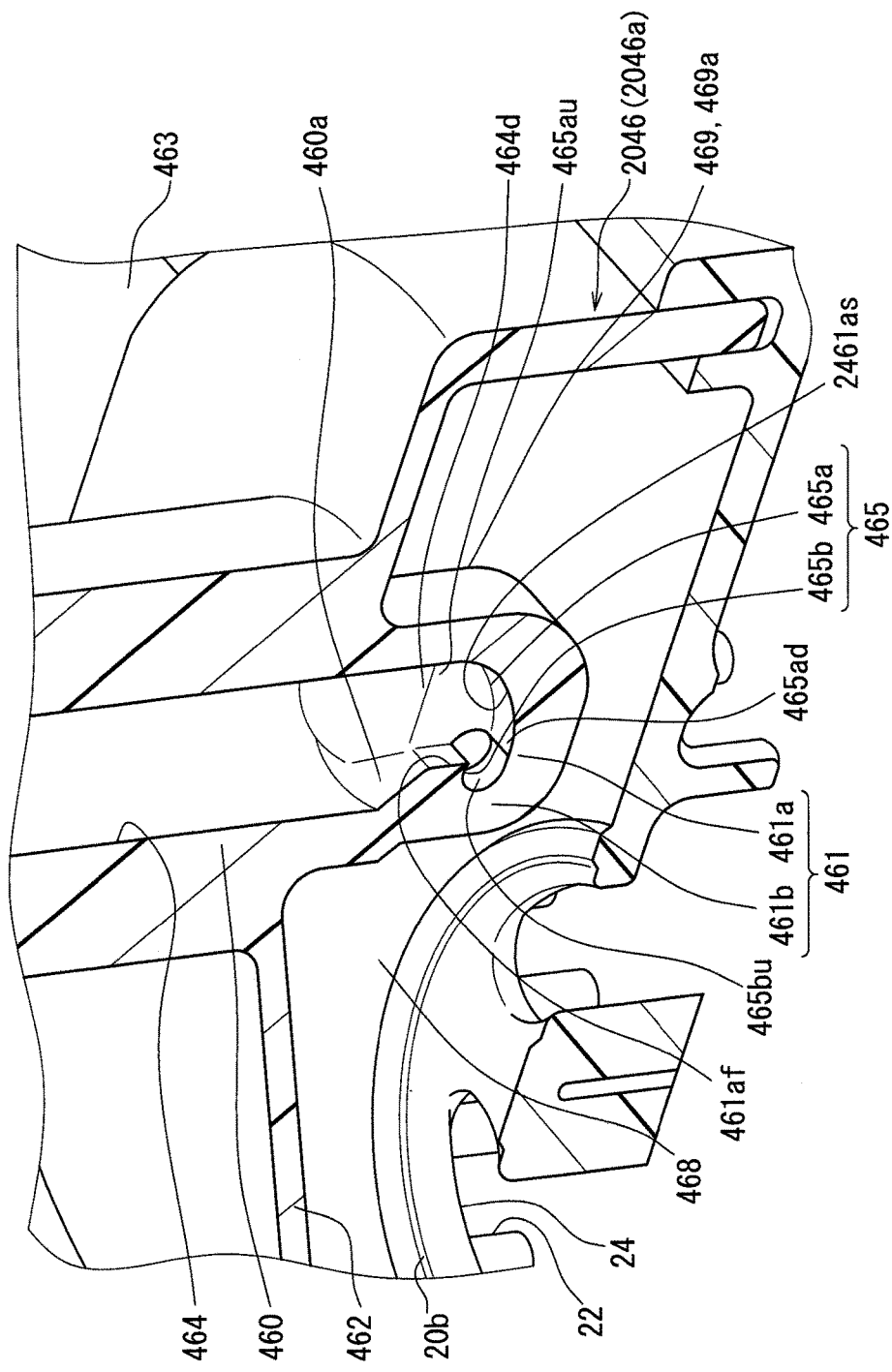
FIG. 15 is a perspective cross-sectional view showing the fuel supply device of FIG. 14.
Figure 16A:
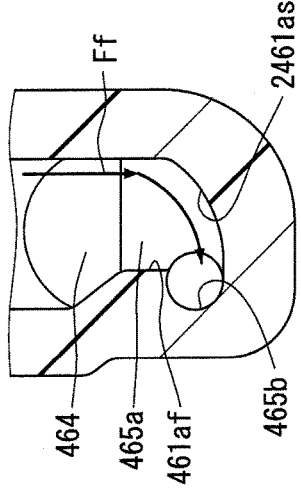
FIG. 16A is a schematic descriptive diagram for describing a fuel flow generated in the fuel supply device of FIG. 14, indicating a cross section corresponding to FIGS. 4 and 6.
Figure 16B:
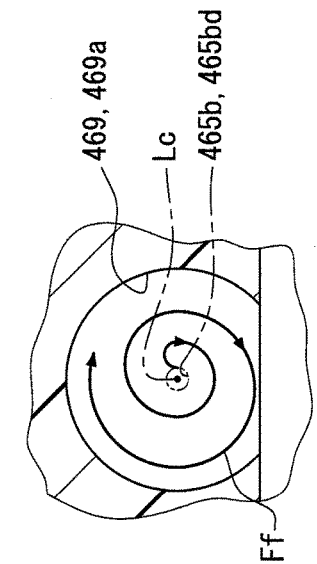
FIG. 16B is a schematic descriptive diagram for describing the fuel flow generated in the fuel supply device of FIG. 14, indicating a cross section taken along XVIb-XVIb in FIG. 16C.
Figure 16C:
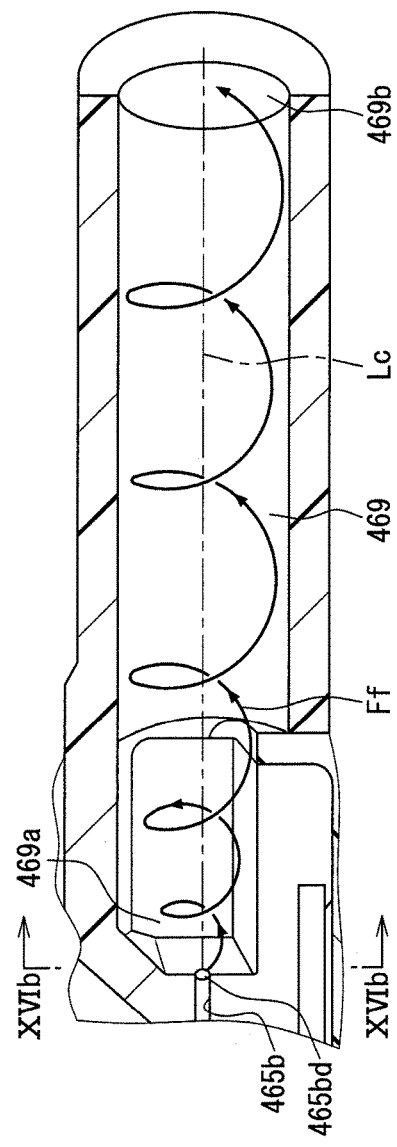
FIG. 16C is a schematic descriptive diagram for describing the fuel flow generated in the fuel supply device of FIG. 14, corresponding to FIG. 3.

As shown in FIGS. 14 and 15, a second embodiment of the present disclosure is a modification of the first embodiment. In the jet pump 2046 of the second embodiment (and thereby a one-piece resin body 2046a of the jet pump 2046), the second passage wall surface 2461as is formed such that the second passage wall surface 2461as is curved from the pressurizing passage 464 side in the clockwise direction in a cross-sectional view of FIGS. 14 and 15, which show the upstream end 465bu of the flow restricting passage section 465b viewed from the communication passage section 465a side. The second passage wall surface 2461as has the similar structure, which is similar to the second passage wall surface 461as of the first embodiment except the above described point. With the above-described structure, as indicated by an arrow in FIG. 16A, the fuel flow Ff flows into the flow restricting passage section 465b while swirling along the second passage wall surface 2461as. Thereby, as indicated by an arrow in FIGS. 16B and 16C, the fuel flow Ff is generated in the diffuser passage 469 such that the fuel flow Ff is swirled in the clockwise direction about the lateral axis Lc in the view taken from the flow restricting passage section 465b. Furthermore, the jet pump 2046 of the second embodiment having the above-described structure is manufactured in a manner similar to that of the jet pump 46 of the first embodiment.

Thus, even in the second embodiment described above, the advantages, which are similar to those of the first embodiment, can be achieved.

Other Embodiments

The present disclosure has been described with reference to the above embodiments. However, the present disclosure is not limited to the above embodiments, and the above embodiments may be modified within the principle of the present disclosure.

Figure 17:
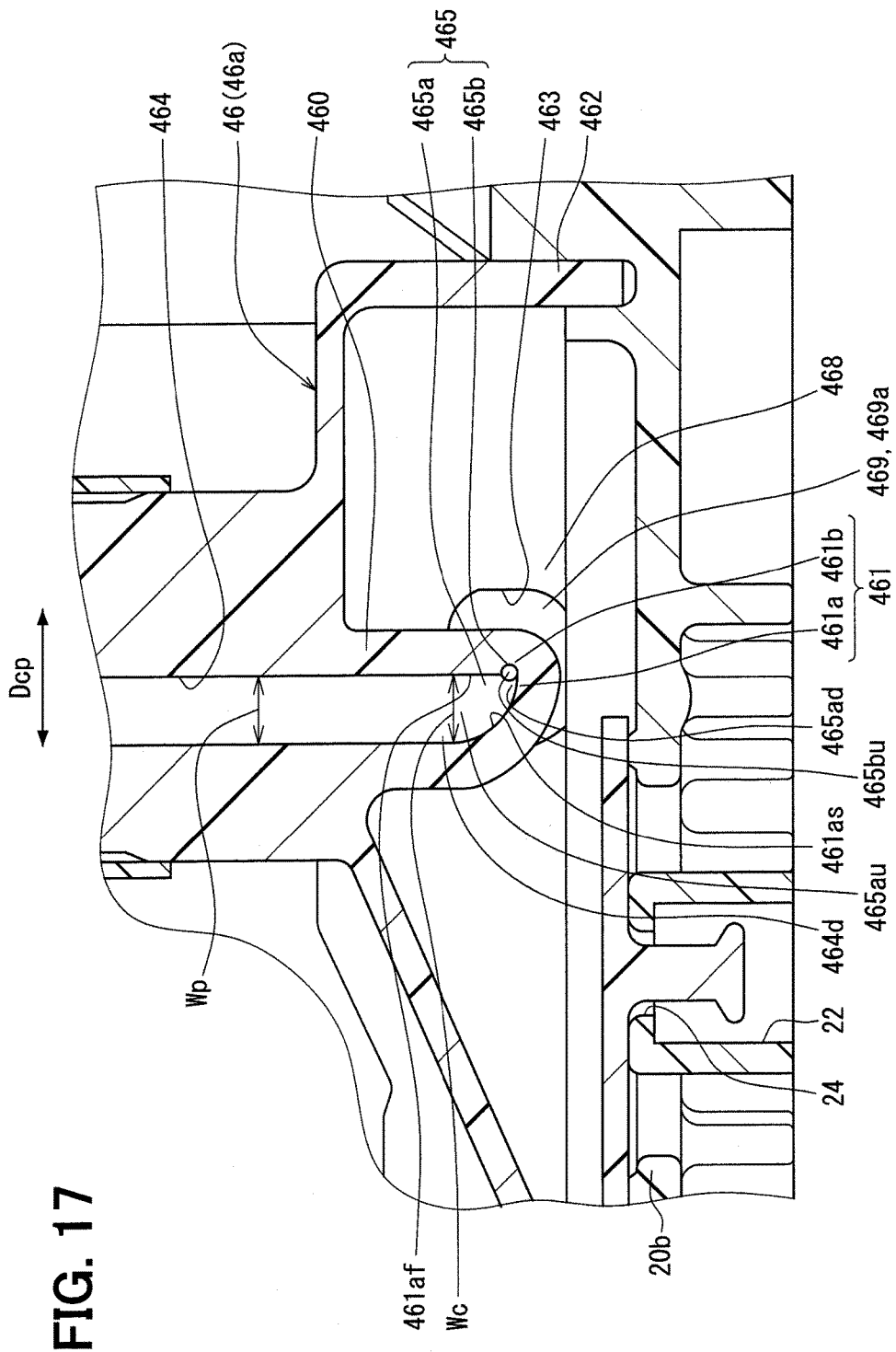
FIG. 17 is a cross-sectional view, showing a modification of FIG. 6.

Specifically, in a first modification of the first and second embodiments, as shown in FIG. 17 (FIG. 17 indicating a modification of the first embodiment), the passage width Wc of the upstream end 465au of the communication passage section 465a, may be set to be equal to the passage width Wp of the pressurizing passage 464. In such a case, the second passage wall surface 461as, 2461as is concavely curved toward the flow restricting passage section 465b such that the passage width Wc of the communication passage section 465a is within a predetermined range that is equal to or smaller than the passage width Wp of the pressurizing passage 464. In the first modification shown in FIG. 17, the second passage wall surface 461as is continuously curved from the downstream end 464d of the pressurizing passage 464 all the way down to the flow restricting passage section 465b.

Figure 18:
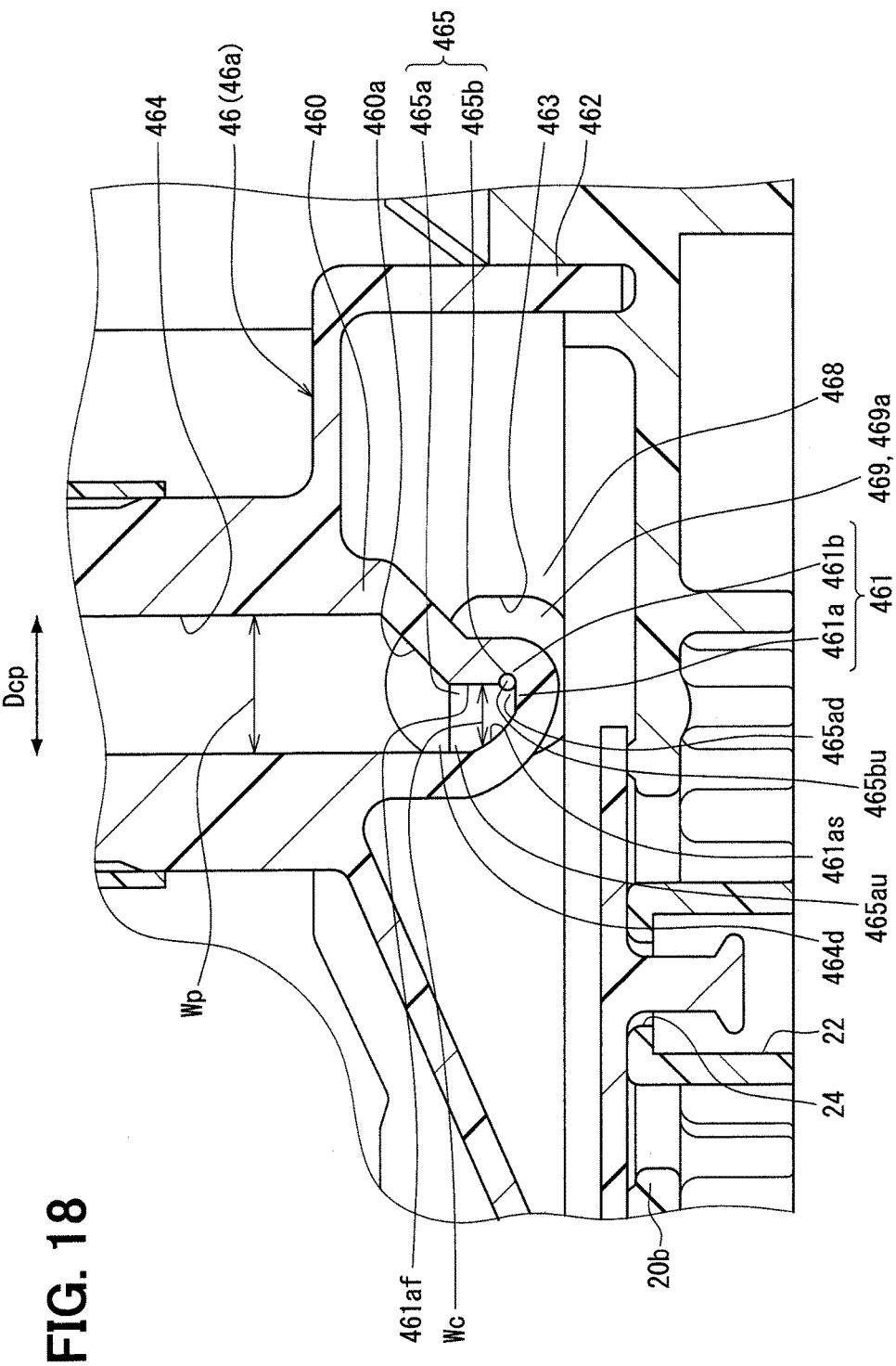
FIG. 18 is a cross-sectional view, showing another modification of FIG. 6.

In a second modification of the first and second embodiments, as shown in FIG. 18 (FIG. 18 showing a modification of the first embodiment), the length of the curve of the second passage wall surface 461as, 2461as may be limited such that the curve of the second passage wall surface 461as, 2461as continuously extends only down to a location that is on the upstream side of the flow restricting passage section 465b.

In a third modification of the first and second embodiments, at least one of the flow restriction forming portion 461b, the diffuser portion 463 and the intake portion 462 may be formed separately from and then fixed to the pressurizing portion 460 and the communication forming portion 461a, which are integrally molded.

In a fourth modification of the first and second embodiments, the present disclosure may be applied to, for example, a jet pump that is received at an outside of the sub-tank 20 in the fuel tank 2 besides the jet pump 46, 2046, which is received in the inside of the sub-tank 20 in the fuel tank 2.

Furthermore, in the above embodiments, the resin body 46a, 2046a is integrally molded as the one-piece resin body. Alternatively, a portion(s) of the resin body 46a, 2046a, which may be other than the portion forming the pressurizing passage 464 and the nozzle passage 465, may be formed separately from and thereafter joined to the rest of the resin body 46a, 2046a, if desired.

What is claimed is:

1. A jet pump comprising a resin body that is made of resin and forms a pressurizing passage, a nozzle passage and a diffuser passage, while stored fuel, which is stored in a fuel tank, is pumped by the jet pump through the diffuser passage by discharging pressurized fuel, which is supplied to the pressurizing passage, into the diffuser passage through the nozzle passage, wherein:

at least a part of the resin body is integrally molded to form the pressurizing passage and the nozzle passage in the resin body;

the nozzle passage includes:

a communication passage section that is communicated with a downstream end of the pressurizing passage; and a flow restricting passage section that is communicated with a downstream end of the communication passage section and reduces a flow rate of the pressurized fuel in comparison to a flow rate of the pressurized fuel which flows through the communication passage section;

a common width direction, along which a passage width of the communication passage section and a passage width of the pressurizing passage are defined, is perpendicular to a direction along which a longitudinal axis of the flow restricting passage section extends;

a first passage wall surface and a second passage wall surface, which define the communication passage section therebetween, are opposed to each other in the common width direction;

the flow restricting passage section opens in the first passage wall surface; and the second passage wall surface is concavely curved relative to the first passage wall surface toward the flow restricting passage section, so that the passage width of the communication passage section is progressively reduced toward the flow restricting passage section to a passage width that is equal to or smaller than the passage width of the pressurizing passage.

2. The jet pump according to claim 1, wherein the passage width of the communication passage section is progressively reduced toward the flow restricting passage section to a passage width that is smaller than the passage width of the pressurizing passage.

3. The jet pump according to claim 1, wherein the second passage wall surface is continuously curved down to the flow restricting passage section.

4. The jet pump according to claim 1, wherein:
the resin body includes:
one resin portion, in which the diffuser passage and the flow restricting passage section are coaxially formed; and
another resin portion, in which the pressurizing passage and the communication passage section are formed; and
the one resin portion and the another resin portion are integrally molded.

5. A manufacturing method of the jet pump of claim 4, comprising:
molding the another resin portion, in which the pressurizing passage and the communication passage section are formed, with a first slide core, and also molding the one resin portion, in which the diffuser passage and the flow restricting passage section are coaxially formed, with a second slide core simultaneously with the molding of the another resin portion.

6. A fuel supply device that supplies stored fuel, which is stored in a fuel tank, to an internal combustion engine located at an outside of the fuel tank, the fuel supply device comprising:
a sub-tank that is placed in an inside of the fuel tank; and
the jet pump of claim 1 that is received in the sub-tank and pumps the stored fuel, which is stored in the fuel tank, into the sub-tank.

\* \* \* \* \*